United States Patent
Rego et al.

(10) Patent No.: US 12,071,535 B2
(45) Date of Patent: Aug. 27, 2024

(54) POLYPROPYLENE RANDOM COPOLYMER COMPOSITION FOR COLD AND HOT WATER PIPE APPLICATIONS

(71) Applicant: W. R. Grace & Co.—Conn., Columbia, MD (US)

(72) Inventors: Jose Manu Rego, Columbia, MD (US); Michelle Ni Paine, Columbia, MD (US); Zhiru Ma, Columbia, MD (US)

(73) Assignee: W.R. Grace & Co.—Conn., Columbia, MD (US)

( * ) Notice: Subject to any disclaimer, the term of this patent is extended or adjusted under 35 U.S.C. 154(b) by 626 days.

(21) Appl. No.: 17/285,708

(22) PCT Filed: Oct. 23, 2019

(86) PCT No.: PCT/US2019/057519
§ 371 (c)(1),
(2) Date: Apr. 15, 2021

(87) PCT Pub. No.: WO2020/086639
PCT Pub. Date: Apr. 30, 2020

(65) Prior Publication Data
US 2022/0002528 A1 Jan. 6, 2022

Related U.S. Application Data

(60) Provisional application No. 62/752,008, filed on Oct. 29, 2018, provisional application No. 62/751,290, filed on Oct. 26, 2018.

(51) Int. Cl.
*C08L 23/16* (2006.01)
*B29C 48/00* (2019.01)
(Continued)

(52) U.S. Cl.
CPC ............ *C08L 23/16* (2013.01); *B29C 48/022* (2019.02); *B29C 48/09* (2019.02); *C08K 5/092* (2013.01);
(Continued)

(58) Field of Classification Search
CPC .......... C08K 3/26; C08K 3/346; C08K 5/053; C08K 5/092; C08K 5/098; C08K 5/1345;
(Continued)

(56) References Cited

U.S. PATENT DOCUMENTS 5,310,950 A 5/1994 Mannion
2004/0054040 A1 3/2004 Lin et al.
(Continued)

FOREIGN PATENT DOCUMENTS

CN 103524903 A 1/2014
CN 103709518 A 4/2014
(Continued)

OTHER PUBLICATIONS

Foreign Office Action and Search Report on RU patent application No. 2021111314 dated Mar. 2, 2023 (12 pages).
(Continued)

*Primary Examiner* — Mark S Kaucher
(74) *Attorney, Agent, or Firm* — Foley & Lardner LLP

(57) ABSTRACT

Polypropylene polymer compositions are disclosed that can be used to produce different types of molded articles, such as extruded piping structures. The polypropylene polymer composition contains a polypropylene random copolymer in combination with a property enhancing agent. The property enhancing agent is incorporated into the polymer composition so that the composition has relatively high impact resistance properties in combination with a relatively high flexural modulus.

20 Claims, 1 Drawing Sheet

(51) Int. Cl.
   *B29C 48/09*   (2019.01)
   *C08K 5/092*   (2006.01)
   *C08K 5/098*   (2006.01)
   *C08K 5/1575*  (2006.01)
   *C08K 5/20*    (2006.01)
   *C08K 5/42*    (2006.01)
   *C08K 5/521*   (2006.01)

(52) U.S. Cl.
   CPC ............ *C08K 5/098* (2013.01); *C08K 5/1575* (2013.01); *C08K 5/20* (2013.01); *C08K 5/42* (2013.01); *C08K 5/521* (2013.01); *C08L 2203/18* (2013.01)

(58) Field of Classification Search
   CPC .......... C08K 5/1575; C08K 5/20; C08K 5/42; C08K 5/521; C08K 5/523; C08K 5/526; C08L 2203/18; C08L 23/16; C08F 2500/31; C08F 2500/30; C08F 210/06
   See application file for complete search history.

(56) References Cited

U.S. PATENT DOCUMENTS

| | | |
|---|---|---|
| 2004/0122196 A1 | 6/2004 | Pierini et al. |
| 2005/0261434 A1 | 11/2005 | Varas et al. |
| 2008/0027197 A1 | 1/2008 | Jaaskelainen et al. |
| 2012/0183961 A1 | 7/2012 | Han et al. |
| 2012/0208961 A1 | 8/2012 | Carnahan et al. |
| 2014/0364553 A1 | 12/2014 | Zhao |
| 2016/0251462 A1 | 9/2016 | Chou et al. |
| 2020/0324507 A1* | 10/2020 | Demanze .............. F16L 11/083 |

FOREIGN PATENT DOCUMENTS

| | | |
|---|---|---|
| CN | 105849141 A | 8/2016 |
| EP | 0 235 956 B1 | 9/1987 |
| EP | 0 790 262 A1 | 8/1997 |
| JP | 2002-338761 A | 11/2002 |
| RU | 2629937 C2 | 9/2017 |
| WO | WO-2017174660 A1 * 10/2017 | .............. B32B 1/08 |

OTHER PUBLICATIONS

Foreign Office Action on CN patent application No. 201980069387.7 dated Feb. 22, 2023 (18 pages).
First Examination Report on IN patent application No. 202117016611 dated Nov. 11, 2022.
Foreign Office Action on ID patent application No. P00202103129 dated Nov. 29, 2022 (6 pages).
Foreign Search Report on EP patent application No. 19876565.3 dated Jun. 21, 2022.
Examination Report, CN 201980069387.7, Dec. 19, 2023, 9 pages.
Notice of Reasons for Rejection, JP 2021-521838, Dec. 7, 2023, 6 pages.

* cited by examiner

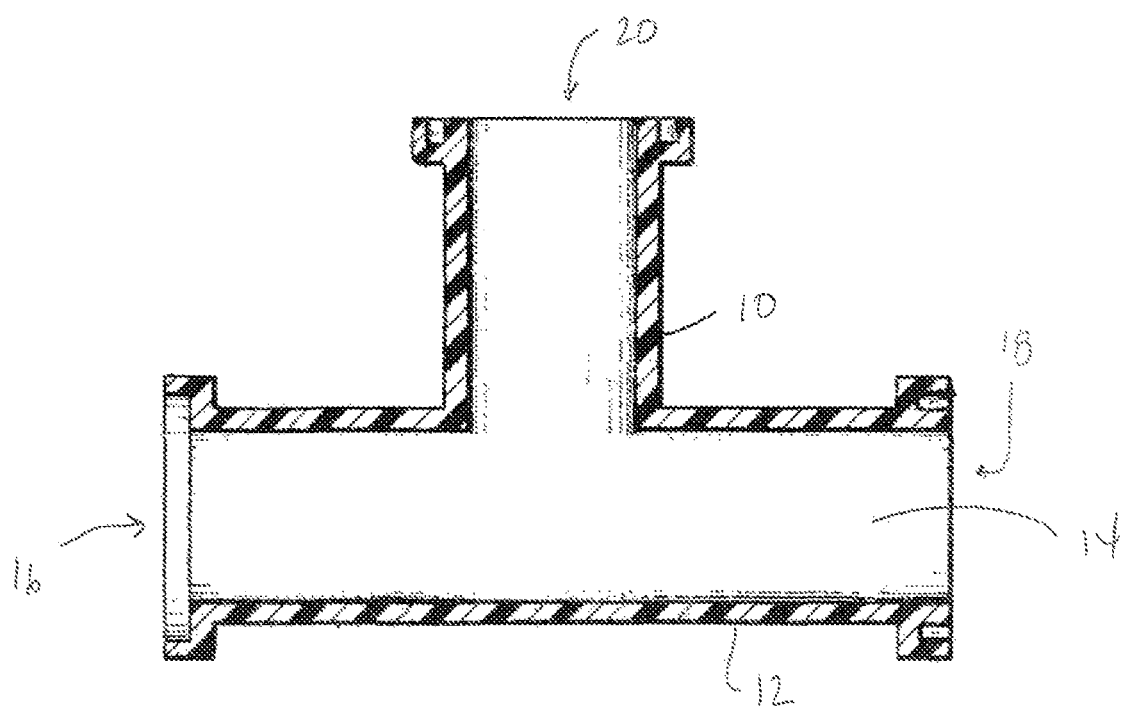

POLYPROPYLENE RANDOM COPOLYMER COMPOSITION FOR COLD AND HOT WATER PIPE APPLICATIONS

RELATED APPLICATIONS

The present application is based on and claims priority to U.S. Provisional Patent application Ser. No. 62/752,008, filed on Oct. 29, 2018, and U.S. Provisional Patent application Ser. No. 62/751,290, filed on Oct. 26, 2018, both of which are incorporated herein by reference.

BACKGROUND

Polymer materials are frequently used for pipes for various purposes, such as fluid transport, i.e. transport of liquid or gas, e.g. water or natural gas, during which the fluid can be pressurized. Moreover, the transported fluid may have varying temperatures, usually within the temperature range of from about 0° C. to about 90° C.

Because of the high temperatures involved, hot water pipes of polymer materials represent a particularly problematic type of polymer pipe. Not only must a hot water polymer pipe fulfill the requirements necessary for other ordinary polymer pipes, such as cold-water pipes, but in addition it must withstand the strain associated with higher temperatures. The temperatures of the hot water in a hot water pipe, typically used for plumbing and heating purposes, range from 30-70° C., which means that the pipe must be able to withstand a higher temperature than that for a secure long-term use. Peak temperatures may be as high as 100° C.

In the past, pipes as described above have been made from polyolefin polymers, such as polypropylene polymers and polyethylene polymers. Problems have been experienced, however, in formulating a polyolefin polymer composition that has the optimum blend of mechanical properties for various different pipe applications. For example, in many applications, a high impact strength resistance is desired in combination with a relatively high flexural modulus. In the past, however, when steps were taken to increase one of the above properties, the other properties were adversely impacted. Consequently, the present disclosure is directed to polymer compositions that have an improved balance of properties between impact resistance and flexural modulus.

BRIEF SUMMARY

In general, the present disclosure is directed to polypropylene polymer compositions containing a polypropylene random copolymer that have been formulated to have an excellent balance of mechanical properties. The polypropylene polymer compositions made according to the present disclosure, for instance, are particularly well suited for producing pipe structures in hot and cold-water pipe applications. In particular, the polypropylene polymer compositions of the present disclosure are engineered in order to not only have high impact strength but also to have a relatively high flexural modulus.

In one embodiment, the present disclosure is directed to a polypropylene polymer composition comprising a polypropylene random copolymer combined with a property enhancing agent. The polypropylene random copolymer can include:
propylene as a primary monomer;
an ethylene content (ET) of from about 1% to about 5% by weight;
a melt flow rate of greater than about 0.01 g/10 min to about 2 g/10 min; and;
a molecular weight distribution of from about 5 to about 10.

In accordance with the present disclosure, the above polypropylene random copolymer is combined with a property enhancing agent in an amount sufficient to increase at least one physical property of the composition, such as impact resistance and/or flexural modulus. For example, the polymer composition of the present disclosure can have an IZOD notched impact resistance at 23° C. of greater than about 400 J/m, such as greater than about 500 J/m, such as greater than about 600 J/m, such as greater than about 700 J/m, and generally less than about 900 J/m. In addition to having a relatively high impact strength resistance, the polymer composition of the present disclosure also has a relatively high flexural modulus. For instance, the flexural modulus can be greater than about 650 MPa, such as greater than about 750 MPa, such as greater than about 850 MPa, such as greater than about 950 MPa, and generally less than about 1200 MPa.

In one embodiment, the property enhancing agent may comprise a phosphate ester salt, sodium benzoate, a dibenzyl sorbitol, or mixtures thereof. In this embodiment, the polymer composition can have a melt flow rate of less than about 0.5 g/10 min, can have an ethylene content of from about 3.3% to about 5%, and can have a molecular weight distribution of from about 5 to about 8. In one embodiment, the polypropylene random copolymer can be monomodal.

In one embodiment, the property enhancing agent may comprise a N,N'-dicyclohexylnaphthalene-2,6-dicarboxamide, a metal salt of 6-quinaziran sulfonic acid, a metal salt of dicarboxylic acid such as a metal salt of 4-cyclohexene, 1-2, diacarboxylic acid, a disodium salt of o-phthalic acid, an isophthalic acid, a terephthalic acid, or a combination of an organic dibasic acid and an oxide, a hydroxide, or an acid of a Group II metal. In this embodiment, the polymer composition can have a melt flow rate of from about 0.15 g/10 min to 2 g/10 min, can have an ethylene content of rom about 1% to about 3% by weight, and can have a molecular weight distribution of from about 6 to about 10.

The property enhancing agent can be added to the polymer composition after the random copolymer has been formed. For instance, the polymer composition can be compounded with the property enhancing agent. In one embodiment, the property enhancing agent can be combined with the polypropylene random copolymer during extrusion of the polymer into a shaped article, such as a pipe structure. The amount of property enhancing agent incorporated into the polymer composition can depend upon numerous factors and the desired result. In general, the property enhancing agent can be present in the polymer composition in an amount from 100 ppm to about 5000 ppm. The polymer composition generally contains the polypropylene random copolymer in an amount greater than about 70% by weight, such as in an amount greater than about 80% by weight, such as in an amount greater than about 90% by weight, such as in an amount greater than about 95% by weight.

The present disclosure is also directed to piping structures and/or piping components made from the polymer composition described above. In one embodiment, for instance, a piping component can include a tubular structure having a length. The tubular structure can define a hollow interior passageway surrounded by a wall. The wall can be made from a polymer composition as described above containing a polypropylene random copolymer combined with a property enhancing agent.

Other features and aspects of the present disclosure are discussed in greater detail below.

BRIEF DESCRIPTION OF THE DRAWINGS

FIG. 1 represents one embodiment of a piping structure made in accordance with the present disclosure. A full and enabling disclosure of the present invention, including the best mode thereof to one skilled in the art, is set forth more particularly in the remainder of the specification, which includes reference to the accompanying FIGURE.

DEFINITIONS AND TESTING PROCEDURES

The term "propylene-ethylene copolymer", as used herein, is a copolymer containing a majority weight percent propylene monomer with ethylene monomer as a secondary constituent. A "propylene-ethylene copolymer" (also sometimes referred to as a polypropylene random copolymer, PPR, PP-R, RCP or RACO) is a polymer having individual repeating units of the ethylene monomer present in a random or statistical distribution in the polymer chain.

Melt flow rate (MFR), as used herein, is measured in accordance with the ASTM D 1238 test method at 230° C. with a 2.16 kg weight for propylene-based polymers.

Xylene solubles (XS) is defined as the weight percent of resin that remains in solution after a sample of polypropylene random copolymer resin is dissolved in hot xylene and the solution is allowed to cool to 25° C. This is also referred to as the gravimetric XS method according to ASTM D5492-98 using a 90 minute precipitation time and is also referred to herein as the "wet method".

The XS "wet method" consists of weighing 2 g of sample and dissolving the sample in 200 ml o-xylene in a 400 ml flask with 24/40 joint. The flask is connected to a water-cooled condenser and the contents are stirred and heated to reflux under nitrogen ($N_2$), and then maintained at reflux for an additional 30 minutes. The solution is then cooled in a temperature controlled water bath at 25° C. for 90 minutes to allow the crystallization of the xylene insoluble (XI) fraction. Once the solution is cooled and the insoluble fraction precipitates from the solution, the separation of the XS portion from the XI portion is achieved by filtering through 25 micron filter paper. One hundred ml of the filtrate is collected into a pre-weighed aluminum pan, and the o-xylene is evaporated from this 100 ml of filtrate under a nitrogen stream. Once the solvent is evaporated, the pan and contents are placed in a 100° C. vacuum oven for 30 minutes or until dry. The pan is then allowed to cool to room temperature and weighed. The xylene soluble portion is calculated as XS (wt %)=$[(m_3-m_2)*2/m_1]*100$, where $m_1$ is the original weight of the sample used, $m_2$ is the weight of empty aluminum pan, and m is the weight of the pan and residue (the asterisk, *, here and elsewhere in the disclosure indicates that the identified terms or values are multiplied).

The sequence distribution of monomers in the polymer may be determined by $^{13}$C-NMR, which can also locate ethylene residues in relation to the neighboring propylene residues. $^{13}$C NMR can be used to measure ethylene content, Koenig B-value, triad distribution, and triad tacticity, and is performed as follows.

The samples are prepared by adding approximately 2.7 g of a 50/50 mixture of tetrachloroethane-d2/orthodichlorobenzene containing 0.025 M Cr(AcAc)3 to 0.20 g sample in a Norell 1001-7 10 mm NMR tube. The samples are dissolved and homogenized by heating the tube and its contents to 150° C. using a heating block. Each sample is visually inspected to ensure homogeneity.

The data are collected using a Bruker 400 MHz spectrometer equipped with a Bruker Dual DUL high-temperature CryoProbe. The data are acquired using 512 transients per data file, a 6 sec pulse repetition delay, 90 degree flip angles, and inverse gated decoupling with a sample temperature of 120° C. All measurements are made on non-spinning samples in locked mode. Samples are allowed to thermally equilibrate for 10 minutes prior to data acquisition. Percent mm tacticity and weight % b ethylene are calculated according to methods commonly used in the art, which is briefly summarized as follows.

With respect to measuring the chemical shifts of the resonances, the methyl group of the third unit in a sequence of 5 contiguous propylene units consisting of head-to-tail bonds and having the same relative chirality is set to 21.83 ppm. The chemical shift of other carbon resonances are determined by using the above-mentioned value as a reference. The spectrum relating to the methyl carbon region (17.0-23 ppm) can be classified into the first region (21.1-21.9 ppm), the second region (20.4-21.0 ppm), the third region (19.5-20.4 ppm) and the fourth region (17.0-17.5 ppm). Each peak in the spectrum is assigned with reference to a literature source such as the articles in, for example, Polymer, T. Tsutsui et al., Vol. 30, Issue 7, (1989) 1350-1356 and/or Macromolecules, H. N. Cheng, 17 (1984) 1950-1955, the contents of which are incorporated herein by reference.

In the first region, the signal of the center methyl group in a PPP (mm) triad is located. In the second region, the signal of the center methyl group in a PPP (mr) triad and the methyl group of a propylene unit whose adjacent units are a propylene unit and an ethylene unit resonates (PPE-methyl group). In the third region, the signal of the center methyl group in a PPP (rr) triad and the methyl group of a propylene unit whose adjacent units are ethylene units resonate (EPE-methyl group).

PPP (mm), PPP (mr) and PPP (rr) have the following three-propylene units-chain structure with head-to-tail bonds, respectively. This is shown in the Fischer projection diagrams below.

PPP(mm):

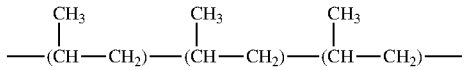

PPP(mr):

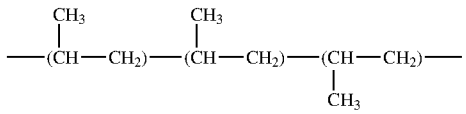

PPP(rr):

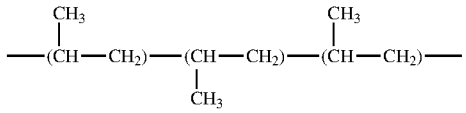

The triad tacticity (mm fraction) of the propylene random copolymer can be determined from a $^{13}$C-NMR spectrum of the propylene random copolymer using the following formula:

$$mm \text{ Fraction} = \frac{PPP(mm)}{PPP(mm) + PPP(mr) + PPP(rr)}$$

The peak areas used in the above calculation are not measured directly from the triad regions in the $^{13}$C-NMR spectrum. The intensities of the mr and rr triad regions need to have subtracted from them the areas due to EPP and EPE sequencing, respectively. The EPP area can be determined from the signal at 30.8 ppm after subtracting from it one-half the area of the sum of the signals between 26 and 27.2 ppm and the signal at 30.1 ppm. The area due to EPE can be determined from the signal at 33.2 ppm.

For convenience, ethylene content is also measured using a Fourier Transform Infrared method (FTIR) which is correlated to ethylene values determined using $^{13}$C NMR, noted above, as the primary method. The relationship and agreement between measurements conducted using the two methods is described in, e.g., J. R. Paxson, J. C. Randall, "Quantitative Measurement of Ethylene Incorporation into Propylene Copolymers by Carbon-13 Nuclear Magnetic Resonance and Infrared Spectroscopy", Analytical Chemistry, Vol. 50, No. 13, November 1978, 1777-1780.

Flexural modulus is determined in accordance with ASTM D790-10 Method A, using a Type 1 specimen per ASTM 3641 (latest version) and molded according to ASTM D4101 (latest version) at 1.3 mm/min.

Mw/Mn (also referred to as "MWD") and Mz/Mw are measured by GPC according to the Gel Permeation Chromatography (GPC) Analytical Method for Polypropylene. The polymers are analyzed on a PL-220 series high temperature gel permeation chromatography (GPC) unit equipped with a refractometer detector and four PLgel Mixed A (20 μm) columns (Polymer Laboratory Inc.). The oven temperature is set at 150° C. and the temperatures of autosampler's hot and the warm zones are at 135° C. and 130° C. respectively. The solvent is nitrogen purged 1,2,4-trichlorobenzene (TCB) containing ~200 ppm 2,6-di-t-butyl-4-methylphenol (BHT). The flow rate is 1.0 mL/min and the injection volume was 200 id A 2 mg/mL sample concentration is prepared by dissolving the sample in N2 purged and preheated TCB (containing 200 ppm BHT) for 2.5 hrs at 160° C. with gentle agitation.

The GPC column set is calibrated by running twenty narrow molecular weight distribution polystyrene standards. The molecular weight (MW) of the standards ranges from 580 to 8,400,000 g/mol, and the standards were contained in 6 "cocktail" mixtures. Each standard mixture has at least a decade of separation between individual molecular weights. The polystyrene standards are prepared at 0.005 g in 20 mL of solvent for molecular weights equal to or greater than 1,000,000 g/mol and 0.001 g in 20 mL of solvent for molecular weights less than 1,000,000 g/mol. The polystyrene standards are dissolved at 150° C. for 30 min under stirring. The narrow standards mixtures are run first and in order of decreasing highest molecular weight component to minimize degradation effect. A logarithmic molecular weight calibration is generated using a fourth-order polynomial fit as a function of elution volume. The equivalent polypropylene molecular weights are calculated by using following equation with reported Mark-Houwink coefficients for polypropylene (Th. G. Scholte, N. L. J. Meijerink, H. M. Schoffeleers, and A. M. G. Brands, J. Appl. Polym. Sci., 29, 3763-3782 (1984)) and polystyrene (E. P. Otocka, R. J. Roe, N Y. Hellman, P. M. Muglia, Macromolecules, 4, 507 (1971)):

$$M_{PP} = \left(\frac{K_{PS}M_{PS}^{M_{PS}+1}}{K_{PP}}\right)^{\frac{1}{M_{PP}+1}}$$

where $M_{pp}$ is PP equivalent MW, $M_{PS}$ is PS equivalent MW, log K and a values of Mark-Houwink coefficients for PP and PS are listed below in Table 1.

TABLE 1

| Polymer | A | Log K |
|---|---|---|
| Polypropylene | 0.725 | −3.721 |
| Polystyrene | 0.702 | −3.900 |

IZOD impact strength is measured in accordance with ASTM D 256 (2018).

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to a polypropylene polymer composition having a unique blend of physical properties. For instance, the polypropylene polymer composition of the present disclosure is formulated and engineered to not only have high impact strength properties, but also to have relatively high flexural modulus properties. In accordance with the present disclosure, in order to obtain a balance of impact resistance and flexural modulus, a polypropylene random copolymer is combined with a property enhancing agent. The property enhancing agent, for instance, may increase the stiffness of the polymer composition, may increase the toughness of the polymer composition or may increase both the stiffness and toughness of the polymer composition. For example, the property enhancing agent is incorporated into the polymer composition in an amount sufficient to increase at least one of the flexural modulus or the impact resistance without adversely affecting the other property.

In addition, the polypropylene polymer composition can have good flow characteristics allowing the composition to make extruded articles. In one embodiment, for instance, the polymer composition can be used to form pipe structures or pipe components for use in cold and hot water pipe applications.

As described above, the polymer composition of the present disclosure has relatively high impact strength resistance in combination with a relatively high flexural modulus. For example, the polymer composition of the present disclosure can have an IZOD notched impact strength at 23° C. of greater than about 400 J/m, such as greater than about 450 J/m, such as greater than about 500 J/m, such as greater than about 550 J/m, such as greater than about 600 J/m, such as greater than about 650 J/m, such as even greater than 700 J/m. The IZOD impact strength at 23° C. is generally less than about 900 J/m. The polymer composition can also display excellent impact strength at lower temperatures. For instance, the polymer composition can have an IZOD impact strength at 0° C. of greater than about 100 J/m, such as greater than about 150 J/m, such as greater than about 200 J/m, the IZOD impact strength at 0° C. is generally less than about 600 J/m.

In general, the polymer composition of the general disclosure can have a flexural modulus of greater than about 650 MPa, such as greater than about 700 MPa, such as greater than about 750 MPa, such as greater than about 800 MPa. In one embodiment, the polymer composition can have a flexural modulus of less than about 1400 MPa, such as less than about 1200 MPa.

Polymer compositions formulated in accordance with the present disclosure can also have suitable flow properties at higher temperatures, such as at temperatures greater than about 180° C., such as greater than about 200° C., such as greater than about 220° C., such as greater than about 240° C., and generally less than about 280° C., such as less than about 260° C. In one embodiment, extruded articles are made in accordance with the present disclosure at temperatures of from about 240° C. to about 260° C., such as from about 250° C. to about 260° C. In general, the polymer composition can have a melt flow rate of less than about 2 g/10 min, such as less than 1.5 g/10 min, such as less than about 1 g/10 min, such as less than about 0.75 g/10 min. The melt flow rate is generally greater than about 0.01 g/10 min, such as greater than about 0.1 g/10 min, such as greater than about 0.15 g/10 min.

The polypropylene polymer composition contains a polypropylene random copolymer. The polypropylene random copolymer generally contains propylene as a primary monomer combined with an alkylene comonomer. For instance, in one embodiment, the comonomer is ethylene. In one particular embodiment, the polypropylene random copolymer contains ethylene generally in an amount less than about 6% by weight, such as in an amount less than about 5% by weight, such as in an amount less than about 4.5% by weight, such as in an amount generally less than about 4% by weight, such as in an amount less than about 3.5% by weight, such as in an amount less than about 3% by weight. The ethylene content is generally greater than about 1%, such as greater than about 1.5%, such as greater than about 2%, such as greater than about 2.5%. In general, increasing the ethylene content of the copolymer can increase the impact resistance properties of the polymer composition. Increasing the ethylene content, however, can also cause a decrease in the flexural modulus. In accordance with the present disclosure, the ethylene content of the random copolymer is carefully controlled in conjunction with the addition of the property enhancing agent. The property enhancing agent works synergistically in conjunction with the ethylene content of the copolymer to produce a polymer composition having not only increased impact resistance, but also increased flexural modulus.

The polypropylene random copolymer in addition to having a controlled ethylene content can also have a relatively low xylene soluble content. For instance, the polymer composition can have a total XS content or fraction of less than about 14% by weight, such as less than about 12% by weight, such as less than about 11% by weight, such as less than about 10% by weight, such as less than about 9% by weight, such as less than about 8% by weight, such as less than about 7% by weight, such as less than about 6% by weight, such as less than about 5% by weight. The XS content is generally greater than about 2% by weight.

The polypropylene copolymer can comprise a Ziegler-Natta catalyzed polymer and can have a relatively controlled molecular weight distribution. For instance, the molecular weight distribution (Mw/Mn) can be greater than about 5, such as greater than about 5.5, such as greater than about 6, such as greater than about 6.5, such as greater than about 7, such as greater than about 7.5, and generally less than about 10, such as less than about 9, such as less than about 8.

In accordance with the present disclosure, the polypropylene random copolymer is combined with a property enhancing agent in order to increase the impact resistance, the flexural modulus, or both the impact resistance and the flexural modulus. The property enhancing agent can be combined with the polypropylene random copolymer during polymerization or preferably after polymerization. For example, the property enhancing agent can be compounded with the polypropylene random copolymer or can be added to the polypropylene random copolymer during formation of polymer articles, such as during an extrusion process.

The property enhancing agent can comprise any suitable compound capable of improving mechanical properties of the polymer composition. In one embodiment, for instance, the property enhancing agent can comprise a chemical component or a mixture of chemical components that can influence the crystallization rate of the polymer. For example, the property enhancing agent, in one embodiment, may change or alter the crystalline and structure of the polypropylene random copolymer. For instance, the property enhancing agent may change the crystal configuration of the polymer by changing the proportion of alpha crystals and beta crystals. Alpha crystals, for instance, can be described as monoclinic, while beta crystals may have a more hexagonal shape. The property enhancing agent can be used to alter and control the crystalline morphology of the polymer based upon the ethylene content of the polymer and various other factors. For example, in one embodiment, the property enhancing agent can be used to increase the proportion of alpha crystals. Alpha crystals can be present in the polymer, for instance, in an amount greater than about 50% by weight, such as in an amount greater than about 60% by weight, such as in an amount greater than about 70% by weight, and generally in an amount less than about 95% by weight. In an alternative embodiment, however, the property enhancing agent can be used to increase the proportion of beta crystals within the polymer. For example, in one embodiment, the property enhancing agent can be used to control beta crystal amounts such that beta crystals are present in the polymer in an amount greater than about 36% by weight, such as in an amount greater than about 40% by weight, such as in an amount greater than about 50% by weight, such as in an amount greater than about 60% by weight, such as in an amount greater than about 65% by weight, such as in an amount greater than about 70% by weight, such as in an amount greater than about 75% by weight and generally in an amount less than about 95% by weight Various different types of property enhancing agents may be incorporated into the polymer composition depending upon the particular application and the desired result. In one embodiment, for instance, the property enhancing agent may comprise sodium benzoate. In an alternative embodiment, the property enhancing agent may comprise a phosphate ester salt. For example, the property enhancing agent may comprise sodium 2,2'-methylene-bis-(4,6-di-tert-butylphenyl) phosphate In an alternative embodiment, the property enhancing agent may comprise a sorbitol compound, such as a sorbitol acetal derivative. In one embodiment, for instance, the property enhancing agent may comprise a dibenzyl sorbitol.

With regard to sorbitol acetal derivatives that can be used as an additive in some embodiments, the sorbitol acetal derivative is shown in Formula (I):

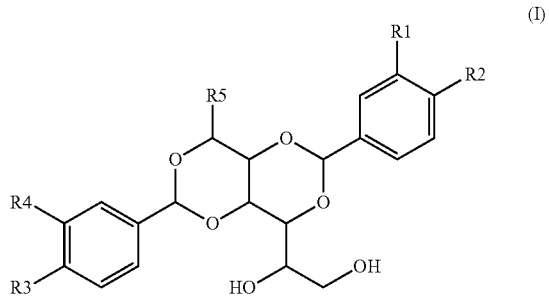

wherein R1-R5 comprise the same or different moieties chosen from hydrogen and a C1-C3 alkyl.

In some embodiments, R1-R5 are hydrogen, such that the sorbitol acetal derivative is 2,4-dibenzylidene sorbitol ("DBS"). In some embodiments, R1, R4, and R5 are hydrogen, and R2 and R3 are methyl groups, such that the sorbitol acetal derivative is 1,3:2,4-di-p-methyldibenzylidene-D-sorbitol ("MDBS"). In some embodiments, R1-R4 are methyl groups and R5 is hydrogen, such that the sorbitol acetal derivative is 1,3:2,4-Bis (3,4-dimethylobenzylideno) sorbitol ("DMDBS"). In some embodiments, R2, R3, and R5 are propyl groups (—CH2-CH2-CH3), and R1 and R4 are hydrogen, such that the sorbitol acetal derivative is 1,2,3-trideoxy-4,6:5,7-bis-O-(4-propylphenyl methylene) nonitol ("TBPMN").

Other embodiments of property enhancing agents that may be used include:
1,3:2,4-dibenzylidenesorbitol
1,3:2,4-bis(p-methylbenzylidene)sorbitol
Di(p-methylbenzylidene)Sorbitol
Di(p-ethylbenzylidene)Sorbitol
Bis(5',6',7',8'-tetrahydro-2-naphtylidene)Sorbitol In one embodiment, the property enhancing agent may also comprise a bisamide, such as benzenetrisamide. In another embodiment, the property enhancing agent may comprise one or more aromatic diamides. In one embodiment, for instance, the property enhancing agent may comprise N,N'-dicyclohexylnaphthalene-2,6-dicarboxamide. The property enhancing agent may also comprise a disodium salt of o-phthalic acid, an isophthalic acid, a terephthalic acid, and salts thereof. In one embodiment, the property enhancing agent may comprise a N,N'-dicyclohexylterephthalamide.

In still another embodiment, the property enhancing agent may comprise a metal salt, such as an aluminum salt of 6-quinaziran sulfonic acid. The property enhancing agent may comprise a quinacridone dye. In one embodiment, the property enhancing agent may comprise 5,12-dihydro-quino (2,3-b) acridine-7,14-dione, quino (2,3b) acridine-6,7,13,14, (5H,12H)-tetrone, or mixtures thereof.

In another embodiment, the property enhancing agent may comprise a metal salt of a carboxylic acid, such as a metal salt of a dicarboxylic acid. For instance, the property enhancing agent may comprise a metal salt of a cycloalkene dicarboxylic acid. The property enhancing agent may comprise a metal salt of 4-cyclohexene, 1-2, dicarboxylic acid.

In another embodiment of the present disclosure, the property enhancing agent may comprise an organic dibasic acid combined with an oxide, a hydroxide, or an acid of a Group II metal. The Group II metal may comprise, for instance, magnesium or calcium. For example, the property enhancing agent may comprise a dicarboxylic acid salt having at least 7 carbon atoms alone or combined with an acid. In one embodiment, the property enhancing agent may comprise calcium stearate alone or combined with an acid, such as pimelic acid. Other examples of similar property enhancing agents include hydrotalcite, talc, and the like. In one embodiment, a metal stearate, hydrotalcite, talc, or similar property enhancing agents may be combined with the other property enhancing agents described above. For instance, in one embodiment, calcium stearate, hydrotalcite, and/or talc can be combined with a metal salt of 4-cyclohexene-1,2-dicarboxylic acid.

The amount of property enhancing agent incorporated into the polymer composition can vary depending upon the particular property enhancing agent selected, the amount of ethylene contained in the propylene random copolymer, upon other characteristics of the polypropylene polymer, upon the desired result, and upon various other factors. In general, the one or more property enhancing agents can be present in the polymer composition in an amount greater than about 200 ppm, such as in an amount greater than about 400 ppm, such as in an amount greater than about 600 ppm, such as in an amount greater than about 800 ppm, such as greater than about 1,000 ppm, such as greater than about 1,200 ppm, such as greater than about 1,400 ppm. One or more property enhancing agents are generally present in an amount less than about 4,000 ppm, such as less than about 3,500 ppm, such as less than about 3,000 ppm, such as less than about 2,500 ppm, such as less than about 2,000 ppm, such as less than about 1,800 ppm, such as less than about 1,600 ppm. In one embodiment, the property enhancing agent can be present in the polymer composition in an amount of from about 250 ppm to about 800 ppm. In an alternative embodiment, the property enhancing agent can be present in the polymer composition in an amount from about 1,000 ppm to about 1,800 ppm.

There are numerous different polymer compositions that can be formulated in accordance with the present disclosure that include a polypropylene random copolymer in conjunction with one or more property enhancing agents. In one embodiment, for instance, the property enhancing agent may comprise sodium benzoate, a phosphate ester salt, or a dibenzyl sorbitol. In this embodiment, the polypropylene random copolymer may have a melt flow rate of less than about 0.5 g/10 min, may have an ethylene content of from about 3.3% by weight to about 5% by weight and can have a molecular weight distribution of from about 5 to about 8. The flexural modulus of the polymer composition can be greater than about 650 MPa and the polymer composition can have an IZOD notched impact resistance of greater than about 4 J/m, such as greater than about 500 J/m.

In an alternative embodiment, the property enhancing agent may comprise N,N'-dicyclohexylnaphthalene-2,6-dicarboxamide and the polypropylene random copolymer may contain ethylene in an amount from about 1% to about 3% by weight and have a melt flow rate of from about 0.15 g/10 min to about 2 g/10 min and a molecular weight distribution of from about 6 to about 10. In this embodiment, the polymer composition may have a flexural modulus of greater than about 800 MPa and can have an IZOD notched impact resistance of greater than about 600 J/m such as greater than about 700 J/m.

In addition to the polypropylene random copolymer and the property enhancing agent, the polymer composition of the present disclosure can contain various other additives and ingredients. For instance, the polypropylene composition can contain nucleators, mold release agents, slip agents, antiblocks, UV stabilizers, heat stabilizer (e.g. DSTDP), colorants/tints, and the like. In one embodiment, the polymer composition can contain an antioxidant, such as a hindered phenolic antioxidant. The polymer composition can also contain an acid scavenger. Each of the additives can be present in the polymer composition generally in an amount less than about 3% by weight, such as in an amount less than about 2% by weight, such as in an amount less than about 1% by weight, such as in an amount less than about 0.5% by weight, and generally in an amount greater than about 0.001% by weight.

The polypropylene random copolymer incorporated into the polymer composition of the present disclosure can be produced using different polymerization methods and procedures. In one embodiment, a Ziegler-Natta catalyst is used to produce the polymer. For example, the olefin polymerization can occur in the presence of a catalyst system that includes a catalyst, an internal electron donor, a cocatalyst, and optionally an external electron donor. Olefins of the formula $CH_2=CHR$, where R is hydrogen or a hydrocarbon radical with 1 to 12 atoms, can be contacted with the catalyst system under suitable conditions to form the polymer products. Copolymerization may occur in a method-step process. The polymerization process can be carried out using known techniques in the gas phase using fluidized bed or stir bed reactors or in a slurry phase using an inert hydrocarbon solvent or diluent or liquid monomer.

The polypropylene random copolymer incorporated into the polymer composition can be a monomodal polymer or can comprise a heterophasic polymer composition. A monomodal random copolymer is generally produced in a single reactor. Monomodal random copolymers are single phased polymers with respect to molecular weight distribution, comonomer content, and melt flow index.

Heterophasic polymers, on the other hand, are typically produced using multiple reactors. In one embodiment, the first phase polymer and the second phase polymer can be produced in a two-stage process that includes a first stage, in which the propylene random copolymer of a continuous polymer phase is prepared, and a second stage, in which an elastomeric propylene copolymer is produced. The first stage polymerization can be carried out in one or more bulk reactors or in one or more gas phase reactors. The second stage polymerization can be carried out in one or more gas phase reactors. The second stage polymerization is typically carried out directly following the first stage polymerization. For example the polymerization product recovered from the first polymerization stage can be conveyed directly to the second polymerization stage. A heterophasic copolymer composition is produced.

In one embodiment of the present disclosure, the polymerizations are carried out in the presence of a stereoregular olefin polymerization catalyst. For example, the catalyst may be a Ziegler-Natta catalyst. For instance, in one embodiment, a catalyst sold under the trade name CONSISTA and commercially available from W. R. Grace & Company can be used. In one embodiment, electron donors are selected that do not contain phthalates.

In one embodiment, the catalyst includes a procatalyst composition that contains a titanium moiety such as titanium chloride, a magnesium moiety such as magnesium chloride, and at least one internal electron donor.

The procatalyst precursor can include (i) magnesium, (ii) a transition metal compound from Periodic Table groups IV-VII, (iii) a halide, an oxylahilde, and or an alkoxide, and/or an alkoxide of (i) or (i) and/or (ii), and (iv) combination of (i), (ii), and (iii). Non limiting examples of suitable procatalyst precursors include halides, oxyhalides, alkoxides of magnesium, manganese, titanium, vanadium, chromium, molybdenum, zirconium, hafnium, and combinations thereof.

In an embodiment, the procatalyst precursor contains magnesium as the sole metal component. Non limiting examples include anhydrous magnesium chloride and/or its alcohol adduct, magnesium alkoxide, and or aryloxide, mixed magnesium alkoxy halide, and/or carboxylated magnesium dialkoxide or aryloxide.

In an embodiment, the procatalyst precursor is an alcohol adduct of anhydrous magnesium chloride. The anhydrous magnesium chloride adduct is generally defined as $MgCl_2$-nROH where n has a range of 1.5-6.0, preferably 2.5-4.0, and most preferably 2.8-3.5 moles total alcohol. ROH is a $C_1$-$C_4$ alcohol, linear or branched, or mixture of alcohol. Preferably ROH is ethanol or a mixture of ethanol and a higher alcohol. If ROH is a mixture, the mole ratio of ethanol to higher alcohol is at least 80:20, preferably 90:10, and most preferably at least 95:5.

In one embodiment, a substantially spherical $MgCl_2$-nEtOH adduct may be formed by a spray crystallization process. In one, embodiment the spherical $MgCl_2$ precursor has an average particle size (Malvern $d_{50}$) of between about 15-150 microns, preferably between 20-100 microns, and most preferably between 35-85 microns.

In one embodiment, the procatalyst precursor contains a transition metal compound and a magnesium metal compound. The transition metal compound has the general formula $TrX_x$ where Tr is the transition metal, X is a halogen or a $C_{1-10}$ hydrocarboxyl or hydrocarbyl group, and x is the number of such X groups in the compound in combination with a magnesium metal compound. Tr may be a Group IV, V or VI metal. In one embodiment, Tr is a Group IV metal, such as titanium. X may be chloride, bromide, $C_{1-4}$ alkoxide or phenoxide, or a mixture thereof. In one embodiment, X is chloride.

The precursor composition may be prepared by the chlorination of the foregoing mixed magnesium compounds, titanium compounds, or mixtures thereof In one embodiment, the precursor composition is a mixed magnesium/titanium compound of the formula $Mg_d Ti(OR^e)_f X_g$ wherein $R^e$ is an aliphatic or aromatic hydrocarbon radical having 1 to 14 carbon atoms or COR' wherein R' is an aliphatic or aromatic hydrocarbon radical having 1 to 14 carbon atoms; each $OR^e$ group is the same or different; X is independently chlorine, bromine or iodine; d is 0.5 to 56; or 2-4, or 3; f is 2 to 116, or 5 to 15; and g is 0.5 to 116, or 1 to 3.

In accordance with the present disclosure, the above described procatalyst precursor is combined with at least one internal electron donor. The internal electron donor can comprise a substituted phenylene aromatic diester.

In one embodiment, the first internal electron donor comprises a substituted phenylene aromatic diester having the following structure (I):

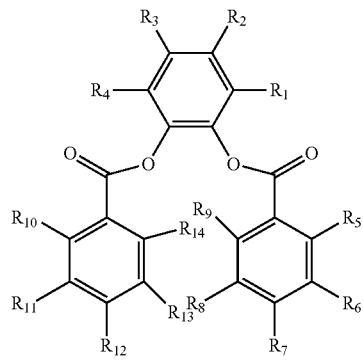

wherein $R_1$-$R_{14}$ are the same or different. Each of $R_1$-$R_{14}$ is selected from hydrogen, a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. At least one $R_1$-$R_{14}$ is not hydrogen.

In one embodiment, the substituted phenylene aromatic diester may be any substituted phenylene aromatic diester as disclosed in U.S. Patent Application Ser. No. 61/141,959 filed on Dec. 31, 2008, the entire content of which is incorporated by reference herein.

In one embodiment, the substituted phenylene aromatic diester may be any substituted phenylene aromatic diester disclosed in WO12088028, filed on Dec. 20, 2011, the entire content of which is incorporated by reference herein.

In one embodiment, at least one (or two, or three, or four) R group(s) of $R_1$-$R_4$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof.

In one embodiment, at least one (or some, or all) R group(s) of $R_5$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. In another embodiment, at least one of $R_5$-$R_9$ and at least one of $R_{10}$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof.

In one embodiment, at least one of $R_1$-$R_4$ and at least one of $R_5$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. In another embodiment, at least one of $R_1$-$R_4$, at least one of $R_5$-$R_9$ and at least one of $R_{10}$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof.

In one embodiment, any consecutive R groups in $R_1$-$R_4$, and/or any consecutive R groups in $R_5$-$R_9$, and/or any consecutive R groups in $R_{10}$-$R_{14}$ may be linked to form an inter-cyclic or an intra-cyclic structure. The inter-/intra-cyclic structure may or may not be aromatic. In one embodiment, the inter-/intra-cyclic structure is a $C_5$ or a $C_6$ membered ring.

In one embodiment, at least one of $R_1$-$R_4$ is selected from a substituted hydrocarbyl group having 1 to 20 carbon atoms, an unsubstituted hydrocarbyl group having 1 to 20 carbon atoms, and combinations thereof. Optionally, at least one of $R_5$-$R_{14}$ may be a halogen atom or an alkoxy group having 1 to 20 carbon atoms. Optionally, $R_1$-$R_4$, and/or $R_5$-$R_9$, and/or $R_{10}$-$R_{14}$ may be linked to form an inter-cyclic structure or an intra-cyclic structure. The inter-cyclic structure and/or the intra-cyclic structure may or may not be aromatic.

In one embodiment, any consecutive R groups in $R_1$-$R_4$, and/or in $R_5$-$R_9$, and/or in $R_{10}$-$R_{14}$, may be members of a $C_5$-$C_6$-membered ring.

In one embodiment, structure (I) includes $R_1$, $R_3$ and $R_4$ as hydrogen. $R_2$ is selected from a substituted hydrocarbyl group having 1 to 20 carbon atoms, an unsubstituted hydrocarbyl group having 1 to 20 carbon atoms, and combinations thereof. $R_5$-$R_{14}$ are the same or different and each of $R_5$-$R_{14}$ is selected from hydrogen, a substituted hydrocarbyl group having 1 to 20 carbon atoms, an unsubstituted hydrocarbyl group having 1 to 20 carbon atoms, an alkoxy group having 1 to 20 carbon atoms, a halogen, and combinations thereof.

In one embodiment, $R_2$ is selected from a $C_1$-$C_8$ alkyl group, a $C_3$-$C_6$ cycloalkyl, or a substituted $C_3$-$C_6$ cycloalkyl group. $R_2$ can be a methyl group, an ethyl group, a n-propyl group, an isopropyl group, a t-butyl group, an isobutyl group, a sec-butyl group, a 2,4,4-trimethylpentan-2-yl group, a cyclopentyl group, and a cyclohexyl group.

In one embodiment, structure (I) includes $R_2$ that is methyl, and each of $R_5$-$R_{14}$ is hydrogen.

In one embodiment, structure (I) includes $R_2$ that is ethyl, and each of $R_5$-$R_{14}$ is hydrogen.

In one embodiment, structure (I) includes $R_2$ that is t-butyl, and each of $R_5$-$R_{14}$ is hydrogen.

In one embodiment, structure (I) includes $R_2$ that is ethoxycarbonyl, and each of $R_5$-$R_{14}$ is hydrogen.

In one embodiment, structure (I) includes $R_2$, $R_3$ and $R_4$ each as hydrogen and $R_1$ is selected from a substituted hydrocarbyl group having 1 to 20 carbon atoms, an unsubstituted hydrocarbyl group having 1 to 20 carbon atoms, and combinations thereof. $R_5$-$R_{14}$ are the same or different and each is selected from hydrogen, a substituted hydrocarbyl group having 1 to 20 carbon atoms, an unsubstituted hydrocarbyl group having 1 to 20 carbon atoms, an alkoxy group having 1 to 20 carbon atoms, a halogen, and combinations thereof.

In one embodiment, structure (I) includes $R_1$ that is methyl, and each of $R_5$-$R_{14}$ is hydrogen.

In one embodiment, structure (I) includes $R_2$ and $R_4$ that are hydrogen and $R_1$ and $R_3$ are the same or different. Each of $R_1$ and $R_3$ is selected from a substituted hydrocarbyl group having 1 to 20 carbon atoms, an unsubstituted hydrocarbyl group having 1 to 20 carbon atoms, and combinations thereof. $R_5$-$R_{14}$ are the same or different and each of $R_5$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a halogen, and combinations thereof.

In one embodiment, structure (I) includes $R_1$ and $R_3$ that are the same or different. Each of $R_1$ and $R_3$ is selected from a $C_1$-$C_8$ alkyl group, a $C_3$-$C_6$ cycloalkyl group, or a substituted $C_3$-$C_6$ cycloalkyl group. $R_5$-$R_{14}$ are the same or different and each of $R_5$-$R_{14}$ is selected from hydrogen, a $C_1$-$C_8$ alkyl group, and a halogen. Nonlimiting examples of suitable $C_1$-$C_8$ alkyl groups include methyl, ethyl, n-propyl, isopropyl, n-butyl, i-butyl, t-butyl, n-pentyl, i-pentyl, neopentyl, t-pentyl, n-hexyl, and 2,4,4-trimethylpentan-2-yl group. Nonlimiting examples of suitable $C_3$-$C_6$ cycloalkyl groups include cyclopentyl and cyclohexyl groups. In a further embodiment, at least one of $R_5$-$R_{14}$ is a $C_1$-$C_8$ alkyl group or a halogen.

In one embodiment, structure (I) includes $R_1$ that is a methyl group and $R_3$ that is a t-butyl group. Each of $R_2$, $R_4$ and $R_5$-$R_{14}$ is hydrogen.

In one embodiment, structure (I) includes $R_1$ and $R_3$ that is an isopropyl group. Each of $R_2$, $R_4$ and $R_5$-$R_{14}$ is hydrogen.

In one embodiment, structure (I) includes each of $R_1$, $R_5$, and $R_{10}$ as a methyl group and $R_3$ is a t-butyl group. Each of $R_2$, $R_4$, $R_6$-$R_9$ and $R_{11}$-$R_{14}$ is hydrogen.

In one embodiment, structure (I) includes each of $R_1$, $R_7$, and $R_{12}$ as a methyl group and $R_3$ is a t-butyl group. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ as a methyl group and $R_3$ is a t-butyl group. Each of $R_7$ and $R_{12}$ is an ethyl group. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes each of $R_1$, $R_5$, $R_7$, $R_9$, $R_{10}$, $R_{12}$, and $R_{14}$ as a methyl group and $R_3$ is a t-butyl group. Each of $R_2$, $R_4$, $R_6$, $R_8$, $R_{11}$, and $R_{13}$ is hydrogen.

In one embodiment, structure (I) includes $R_1$ as a methyl group and $R_3$ is a t-butyl group. Each of $R_5$, $R_7$, $R_9$, $R_{10}$, $R_{12}$, and $R_{14}$ is an i-propyl group. Each of $R_2$, $R_4$, $R_6$, $R_8$, $R_{11}$, and $R_{13}$ is hydrogen.

In one embodiment, the substituted phenylene aromatic diester has a structure (II) which includes $R_1$ that is a methyl group and $R_3$ is a t-butyl group. Each of $R_2$ and $R_4$ is hydrogen. $R_8$ and $R_9$ are members of a $C_6$ membered ring to form a 1-naphthoyl moiety. $R_{13}$ and $R_{14}$ are members of a $C_6$ membered ring to form another 1-naphthoyl moiety. Structure (II) is provided below.

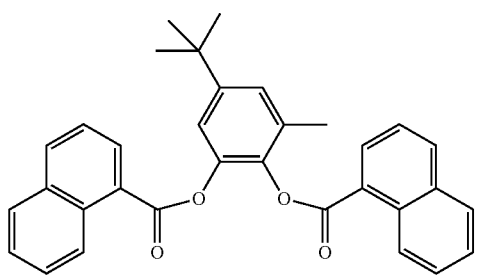 [SMILES: Cc1cc(C(C)(C)C)cc(OC(=O)c2cccc3ccccc23)c1OC(=O)c1cccc2ccccc12]

In one embodiment, the substituted phenylene aromatic diester has a structure (III) which includes $R_1$ that is a methyl group and $R_3$ is a t-butyl group. Each of $R_2$ and $R_4$ is hydrogen. $R_6$ and $R_7$ are members of a $C_6$ membered ring to form a 2-naphthoyl moiety. $R_{12}$ and $R_{13}$ are members of a $C_6$ membered ring to form a 2-naphthoyl moiety. Structure (III) is provided below.

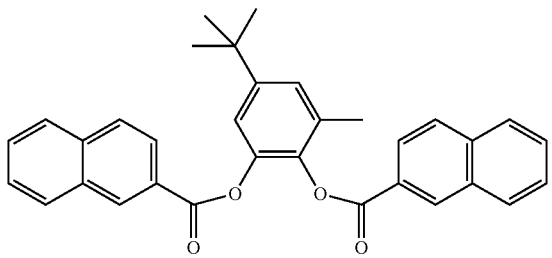 [SMILES: Cc1cc(C(C)(C)C)cc(OC(=O)c2ccc3ccccc3c2)c1OC(=O)c1ccc2ccccc2c1]

In one embodiment, structure (I) includes $R_1$ that is a methyl group and $R_3$ is a t-butyl group. Each of $R_7$ and $R_{12}$ is an ethoxy group. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ that is a methyl group and $R_3$ is a t-butyl group. Each of $R_7$ and $R_{12}$ is a fluorine atom. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ that is a methyl group and $R_3$ is a t-butyl group. Each of $R_7$ and $R_{12}$ is a chlorine atom. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ that is a methyl group and $R_3$ is a t-butyl group. Each of $R_7$ and $R_{12}$ is a bromine atom. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ that is a methyl group and $R_3$ is a t-butyl group. Each of $R_7$ and $R_{12}$ is an iodine atom. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ that is a methyl group and $R_3$ is a t-butyl group. Each of $R_6$, $R_7$, $R_{11}$, and $R_{12}$ is a chlorine atom. Each of $R_2$, $R_4$, $R_5$, $R_8$, $R_9$, $R_{10}$, $R_{13}$, and $R_{14}$ is hydrogen.

In one embodiment, structure (I) includes $R_1$ that is a methyl group and $R_3$ is a t-butyl group. Each of $R_6$, $R_8$, $R_{11}$, and $R_{13}$ is a chlorine atom. Each of $R_2$, $R_4$, $R_5$, $R_7$, $R_9$, $R_{10}$, $R_{12}$, and $R_{14}$ is hydrogen.

In one embodiment, structure (I) includes $R_1$ that is a methyl group and $R_3$ is a t-butyl group. Each of $R_2$, $R_4$ and $R_5$-$R_{14}$ is a fluorine atom.

In one embodiment, structure (I) includes $R_1$ that is a methyl group and $R_3$ is a t-butyl group. Each of $R_7$ and $R_{12}$ is a trifluoromethyl group. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ that is a methyl group and $R_3$ is a t-butyl group. Each of $R_7$ and $R_{12}$ is an ethoxycarbonyl group. Each of $R_2$, $R_4$, $R_5$, $R_6$, $R_8$, $R_9$, $R_{10}$, $R_{11}$, $R_{13}$ and $R_{14}$ is hydrogen.

In one embodiment, $R_1$ is a methyl group and $R_3$ is a t-butyl group. Each of $R_7$ and $R_{12}$ is an ethoxy group. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ that is a methyl group and $R_3$ is a t-butyl group. Each of $R_7$ and $R_{12}$ is a diethylamino group. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ that is a methyl group and $R_3$ is a 2,4,4-trimethylpentan-2-yl group. Each of $R_2$, $R_4$ and $R_5$-$R_{14}$ is hydrogen.

In one embodiment, structure (I) includes $R_1$ and $R_3$, each of which is a sec-butyl group. Each of $R_2$, $R_4$ and $R_5$-$R_{14}$ is hydrogen.

In one embodiment, the substituted phenylene aromatic diester has a structure (IV) whereby $R_1$ and $R_2$ are members of a $C_6$ membered ring to form a 1,2-naphthalene moiety. Each of $R_5$-$R_{14}$ is hydrogen. Structure (IV) is provided below.

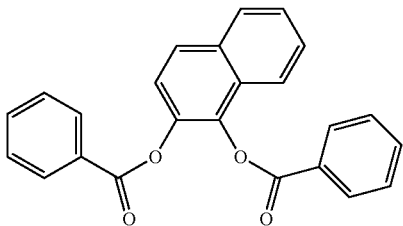 [SMILES: O=C(Oc1ccc2ccccc2c1OC(=O)c1ccccc1)c1ccccc1]

In one embodiment, the substituted phenylene aromatic diester has a structure (V) whereby $R_2$ and $R_3$ are members of a $C_6$ membered ring to form a 2,3-naphthalene moiety. Each of $R_5$-$R_{14}$ is hydrogen. Structure (V) is provided below.

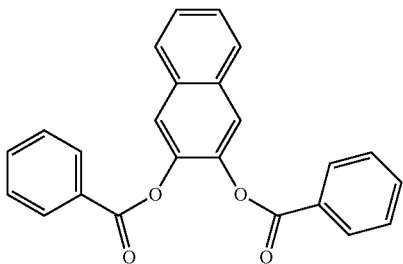 [SMILES: O=C(Oc1cc2ccccc2cc1OC(=O)c1ccccc1)c1ccccc1]

In one embodiment, structure (I) includes $R_1$ and $R_4$ that are each a methyl group. Each of $R_2$, $R_3$, $R_5$-$R_9$ and $R_{10}$-$R_{14}$ is hydrogen.

In one embodiment, structure (I) includes $R_1$ that is a methyl group. $R_4$ is an i-propyl group. Each of $R_2$, $R_3$, $R_5$-$R_9$ and $R_{10}$-$R_{14}$ is hydrogen.

In one embodiment, structure (I) includes $R_1$, $R_3$, and $R_4$, each of which is an i-propyl group. Each of $R_2$, $R_5$-$R_9$ and $R_{10}$-$R_{14}$ is hydrogen.

In one embodiment, each of $R_1$ and $R_4$ is selected from a methyl group, an ethyl group, and a vinyl group. Each of $R_2$ and $R_3$ is selected from hydrogen, a secondary alkyl group, or a tertiary alkyl group, with $R_2$ and $R_3$ not concurrently being hydrogen. Stated differently, when $R_2$ is hydrogen, $R_3$ is not hydrogen (and vice versa).

In one embodiment, a second internal electron donor may be used that generally comprises a polyether that can coordinate in bidentate fashion. In one embodiment the second internal electron donor is a substituted 1,3-diether of structure VI:

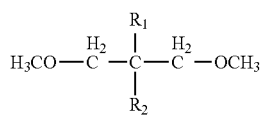

Where $R_1$ and $R_2$ are the same or different, methyl, $C_2$-$C_{18}$ linear or branched alkyls, $C_3$-$C_{18}$ cycloalkyl, $C_4$-$C_{18}$ cycloalkyl-alkyl, $C_4$-$C_{18}$ alkyl-cycloalkyl, phenyl, organosilicon, $C_7$-$C_{18}$ arylalkyl, or $C_7$-$C_{18}$ alkylaryl radicals; and $R_1$ or $R_2$ may also be a hydrogen atom.

In one embodiment the second internal electron donor may comprise a 1,3-diether with cyclic or polycyclic structure VII:

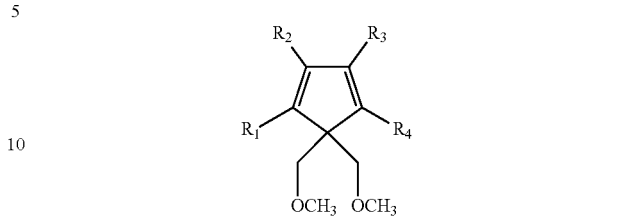

Where $R_1$, $R_2$, $R_3$, and $R_4$ are as described for $R_1$ and $R_2$ of structure VI or may be combined to form one or more $C_5$-$C_7$ fused aromatic or non-aromatic ring structures, optionally containing an N, O, or S heteroatom. Particular examples of the second internal electron donor include 4,4-bis(methoxymethyl)-2,6-dimethyl heptane, 9,9-bis(methoxymethyl)fluorene, or mixtures thereof.

The precursor is converted to a solid procatalyst by further reaction (halogenation) with an inorganic halide compound, preferably a titanium halide compound, and incorporation of the internal electron donors.

One suitable method for halogenation of the precursor is by reacting the precursor at an elevated temperature with a tetravalent titanium halide, optionally in the presence of a hydrocarbon or halohydrocarbon diluent. The preferred tetravalent titanium halide is titanium tetrachloride.

The resulting procatalyst composition can generally contain titanium in an amount from about 0.5% to about 6% by weight, such as from about 1.5% to about 5% by weight, such as from about 2% to about 4% by weight. The solid catalyst can contain magnesium generally in an amount greater than about 5% by weight, such as in an amount greater than about 8% by weight, such as in an amount greater than about 10% by weight, such as in an amount greater than about 12% by weight, such as in an amount greater than about 14% by weight, such as in an amount greater than about 16% by weight. Magnesium is contained in the catalyst in an amount less than about 25% by weight, such as in an amount less than about 23% by weight, such as in an amount less than about 20% by weight. The internal electron donor can be present in the catalyst composition in an amount less than about 30% by weight, such as in an amount less than about 25% by weight, such as in an amount less than about 22% by weight, such as in an amount less than about 20% by weight, such as in an amount less than about 19% by weight. The internal electron donor is generally present in an amount greater than about 5% by weight, such as in an amount greater than about 9% by weight.

In one embodiment, the procatalyst composition is combined with a cocatalyst to form a catalyst system. A catalyst system is a system that forms an olefin-based polymer when contacted with an olefin under polymerization conditions. The catalyst system may optionally include an external electron donor, an activity limiting agent, and/or various other components.

As used herein, a "cocatalyst" is a substance capable of converting the procatalyst to an active polymerization catalyst. The cocatalyst may include hydrides, alkyls, or aryls of aluminum, lithium, zinc, tin, cadmium, beryllium, magnesium, and combinations thereof. In one embodiment, the cocatalyst is a hydrocarbyl aluminum cocatalyst represented by the formula $R_3Al$ wherein each R is an alkyl, cycloalkyl, aryl, or hydride radical; at least one R is a hydrocarbyl radical; two or three R radicals can be joined in a cyclic radical forming a heterocyclic structure; each R can be the same or different; and each R, which is a hydrocarbyl radical, has 1 to 20 carbon atoms, and preferably 1 to 10 carbon atoms. In a further embodiment, each alkyl radical can be straight or branched chain and such hydrocarbyl radical can be a mixed radical, i.e., the radical can contain alkyl, aryl, and/or cycloalkyl groups. Nonlimiting examples of suitable radicals are: methyl, ethyl, n-propyl, isopropyl, n-butyl, isobutyl, tert-butyl, n-pentyl, neopentyl, n-hexyl, 2-methylpentyl, n-heptyl, n-octyl, isooctyl, 2-ethylhexyl, 5,5-dimethylhexyl, n-nonyl, n-decyl, isodecyl, n-undecyl, n-dodecyl.

Nonlimiting examples of suitable hydrocarbyl aluminum compounds are as follows: triisobutylaluminum, tri-n-hexylaluminum, diisobutylaluminum hydride, di-n-hexylaluminum hydride, isobutylaluminum dihydride, n-hexylaluminum dihydride, diisobutylhexylaluminum, isobutyldihexylaluminum, trimethylaluminum, triethylaluminum, tri-n-propylaluminum, triisopropylaluminum, tri-n-butylaluminum, tri-n-octylaluminum, tri-n-decylaluminum, tri-n-dodecylaluminum. In one embodiment, preferred cocatalysts are selected from triethylaluminum, triisobutylaluminum, tri-n-hexylaluminum, diisobutylaluminum hydride, and di-n-hexylaluminum hydride, and most preferred cocatalyst is triethylaluminum.

In one embodiment, the cocatalyst is a hydrocarbyl aluminum compound represented by the formula $R_nAlX_{3-n}$ wherein n=1 or 2, R is an alkyl, and X is a halide or alkoxide. Nonlimiting examples of suitable compounds are as follows: methylaluminoxane, isobutylaluminoxane, diethylaluminum ethoxide, diisobutylaluminum chloride, tetraethyldialuminoxane, tetraisobutyldialuminoxane, diethylaluminum chloride, ethylaluminum dichloride, methylaluminum dichloride, and dimethylaluminum chloride.

In one embodiment, the catalyst composition includes an external electron donor. As used herein, an "external electron donor" is a compound added independent of procatalyst formation and contains at least one functional group that is capable of donating a pair of electrons to a metal atom. Bounded by no particular theory, it is believed that the external electron donor enhances catalyst stereoselectivity, (i.e., to reduces xylene soluble material in the formant polymer).

In one embodiment, the external electron donor may be selected from one or more of the following: an alkoxysilane, an amine, an ether, a carboxylate, a ketone, an amide, a carbamate, a phosphine, a phosphate, a phosphite, a sulfonate, a sulfone, and/or a sulfoxide.

In one embodiment, the external electron donor is an alkoxysilane. The alkoxysilane has the general formula: $SiR_m(OR')_{4-m}$ (I) where R independently each occurrence is hydrogen or a hydrocarbyl or an amino group optionally substituted with one or more substituents containing one or more Group 14, 15, 16, or 17 heteroatoms, said R' containing up to 20 atoms not counting hydrogen and halogen; R' is a $C_{1-4}$ alkyl group; and m is 0, 1, 2 or 3. In an embodiment, R is $C_{6-12}$ aryl, alkyl or aralkyl, $C_{3-12}$ cycloalkyl, $C_{3-12}$ branched alkyl, or $C_{3-12}$ cyclic or acyclic amino group, R' is $C_{1-4}$ alkyl, and m is 1 or 2. Nonlimiting examples of suitable silane compositions include dicyclopentyldimethoxysilane, di-tert-butyldimethoxysilane, methylcyclohexyldimethoxysilane, methylcyclohexyldiethoxysilane, ethylcyclohexyldimethoxysilane, diphenyldimethoxysilane, diisopropyldimethoxysilane, di-n-propyldimethoxysilane, diisobutyldimethoxysilane, diisobutyldiethoxysilane, isobutylisopropyldimethoxysilane, di-n-butyldimethoxysilane, cyclopentyltrimethoxysilane, isopropyltrimethoxysilane, n-propyltrimethoxysilane, n-propyltriethoxysilane, ethyltriethoxysilane, tetramethoxysilane, tetraethoxysilane, diethylaminotriethoxysilane, cyclopentylpyrrolidinodimethoxysilane, bis(pyrrolidino)dimethoxysilane, bis(perhydroisoquinolino)dimethoxysilane, and dimethyldimethoxysilane. In one embodiment, the silane composition is dicyclopentyldimethoxysilane (DCPDMS), methylcyclohexyldimethoxysilane (MChDMS), diisopropyldimethoxysilane (DIPDMS), n-propyltrimethoxysilane (NPTMS), diethylaminotriethoxysilane (DATES), or n-propyltriethoxysilane (PTES), and any combination of thereof.

In one embodiment, the external donor can be a mixture of at least 2 alkoxysilanes. In a further embodiment, the mixture can be dicyclopentyldimethoxysilane and methylcyclohexyldimethoxysilane, dicyclopentyldimethoxysilane and tetraethoxysilane, or dicyclopentyldimethoxysilane and n-propyltriethoxysilane.

In one embodiment, the external electron donor is selected from one or more of the following: a benzoate, and/or a diol ester. In another embodiment, the external electron donor is 2,2,6,6-tetramethylpiperidine. In still another embodiment, the external electron donor is a diether.

In one embodiment, the catalyst composition includes an activity limiting agent (ALA). As used herein, an "activity limiting agent" ("ALA") is a material that reduces catalyst activity at elevated temperature (i.e., temperature greater than about 85° C.). An ALA inhibits or otherwise prevents polymerization reactor upset and ensures continuity of the polymerization process. Typically, the activity of Ziegler-Natta catalysts increases as the reactor temperature rises. Ziegler-Natta catalysts also typically maintain high activity near the melting point temperature of the polymer produced. The heat generated by the exothermic polymerization reaction may cause polymer particles to form agglomerates and may ultimately lead to disruption of continuity for the polymer production process. The ALA reduces catalyst activity at elevated temperature, thereby preventing reactor upset, reducing (or preventing) particle agglomeration, and ensuring continuity of the polymerization process.

The activity limiting agent may be a carboxylic acid ester, a diether, a poly(alkene glycol), poly(alkene glycol)ester, a diol ester, and combinations thereof. The carboxylic acid ester can be an aliphatic or aromatic, mono- or poly-carboxylic acid ester. Nonlimiting examples of suitable monocarboxylic acid esters include ethyl and methyl benzoate, ethyl p-methoxybenzoate, methyl p-ethoxybenzoate, ethyl p-ethoxybenzoate, ethyl acrylate, methyl methacrylate, ethyl acetate, ethyl p-chlorobenzoate, hexyl p-aminobenzoate, isopropyl naphthenate, n-amyl toluate, ethyl cyclohexanoate and propyl pivalate.

In one embodiment, the external electron donor and/or activity limiting agent can be added into the reactor separately. In another embodiment, the external electron donor and the activity limiting agent can be mixed together in advance and then added into the reactor as a mixture. In the mixture, more than one external electron donor or more than one activity limiting agent can be used. In one embodiment, the mixture is dicyclopentyldimethoxysilane and isopropyl myristate, dicyclopentyldiniethoxysilane and poly(ethylene glycol) laurate, dicyclopentyldimethoxysilane and isopropyl myristate and poly(ethylene glycol) dioleate, methylcyclohexyldimethoxysilane and isopropyl myristate, n-propyltrimethoxysilane and isopropyl myristate, dimethyldimethoxysilane and methylcyclohexyldimethoxysilane and isopropyl myristate, dicyclopentyldimethoxysilane and n-propyltriethoxysilane and isopropyl myristate, and dicyclopentyldimethoxysilane and tetraethoxysilane and isopropyl myristate, and combinations thereof.

In one embodiment, the catalyst composition includes any of the foregoing external electron donors in combination with any of the foregoing activity limiting agents.

In accordance with the present disclosure, once the polypropylene random copolymer is produced, the copolymer is combined with a property enhancing agent in accordance with the present disclosure in order to increase impact strength resistance, flexural modulus, or both. In one embodiment, for instance, the property enhancing agent increases the impact resistance of the polymer composition by at least about 10%, such as by at least 20%, such as by at least 30%, such as by at least 40%, and generally less than about 200%. In an alternative embodiment, the property enhancing agent can be incorporated into the polymer composition such that the flexural modulus increases by about 10%, such as at least about 20%, such as at least about 30%, such as at least about 40%, such as at least about 50%, and generally less than about 200%.

The polymer composition of the present disclosure can be used to produce numerous products and articles. The polymer composition, for instance, can be used to extrude various different articles, such as piping structures.

For example, referring to FIG. 1, one embodiment of a piping structure 10 that may be made in accordance with the present disclosure is shown. As illustrated, piping structure 10 includes a wall 12 made from the polymer composition of the present disclosure. The wall 12 defines a hollow interior passageway 14. In the embodiment illustrated in FIG. 1, the piping structure 10 includes a first opening 16 located opposite a second opening 18. In addition, the piping structure 10 includes an opening 20. The piping structure 10 illustrated in FIG. 1 has a "T" shape.

It should be understood, however, that various different piping structure may be made in accordance with the present disclosure including linear pipes, curved pipes such as elbows, fittings, and the like.

The present disclosure may be better understood with reference to the following example.

Example

The following example demonstrates the improvement in physical properties of polymer compositions made in accordance with the present disclosure in comparison to polymer compositions not containing a property enhancing agent.

A polypropylene and ethylene random copolymer was polymerized in a reactor using a non-phthalate catalyst as described above. The polymerization occurred using a single reactor to produce a monomodal polypropylene random copolymer.

Polymer pellet samples were produced that were injected molded into specimens. An additive package was added to the polymer which included 3000 ppm of pentaerythritol tetrakis(3-(3,5-di-tert-butyl-4-hydroxyphenyl)propionate); 1500 ppm of tris(2,4-ditert-butylphenyl)phosphite; 300 ppm of a calcium stearate; and 3000 ppm of 1,3,5-trimethyl-2,4,6-tris(3,5-di-tert-butyl-4-hydroxybenzyl) benzene. The specimens were made according to ASTM Test D4101 to produce specimens for flex and IZOD Testing.

In the samples below, Sample Nos. 1 through 8 did not contain a property enhancing agent. Sample Nos. 9 and 10, on the other hand contained 500 ppm of N,N'-dicyclohexylnaphthalene-2,6-dicarboxamide. Sample No. 11 contained 900 ppm sodium benzoate. Sample No. 12 contained 500 ppm of metal salt of 4-cyclehexene-1,2-dicarboxylic acid, Sample No. 13 contained 1000 ppm of metal salt of 4-cyclehexene-1,2-dicarboxylic acid, Sample No. 14 contained 500 ppm of metal salt of 4-cyclehexene-1,2-dicarboxylic acid, Sample No. 15 contained 1000 ppm of metal salt of 4-cyclehexene-1,2-dicarboxylic acid, Sample No. 16 contained 1200 ppm sodium benzoate, and Sample No. 17 contained 1500 ppm sodium benzoate. Sample No. 18 contained 250 ppm sodium 2,2'-methylene-bis-(4,6-di-tert-butylphenyl) phosphate, and Sample No. 19 contained 500 ppm of sodium 2,2'-methylene-bis-(4,6-di-tert-butylphenyl) phosphate. Sample No. 20 contained 1800 ppm 1,3:2,4-bis(3,4-dimethylbenzylidene) sorbitol, Sample No. 21 contained 800 ppm of 1,3:2,4-bis(3,4-dimethylbenzylidene) sorbitol, Sample No. 22 contained 1300 ppm of 1,3:2,4-bis(3,4-dimethylbenzylidene) sorbitol, and Sample No. 23 contained 1800 ppm of 1,3:2,4-bis(3,4-dimethylbenzylidene) sorbitol.

Sample Nos. 11, 16 and 17 did not contain any calcium stearate. The formulations were tested for flexural modulus, impact resistance and tensile strength at yield.

As shown in the table below, the ethylene content of the polypropylene random copolymer varied. The ethylene content of Sample Nos. 1 and 2 generally matched the ethylene content of Sample No. 10, 12 and 13. The ethylene content of Sample No. 4 generally matched the ethylene content of Sample No. 9. Sample Nos. 14 and 15 contained ethylene in an amount of about 3%. The remaining samples generally contained ethylene in an amount from 3.3% by weight to 4.5% by weight.

The following results were obtained:

TABLE 1

| Sample No. | MFR, g/min | Et % | XS % | Flex Modulus, MPa | N. IZOD at RT, J/m | Tensile strength at yield, MPa |
| --- | --- | --- | --- | --- | --- | --- |
| 1 | 0.19 | 1.9 | 3.9 | 1162 | 114 | 34 |
| 2 | 0.16 | 1.99 | 4.4 | 1123 | 89 | 33 |
| 3 | 0.20 | 2.84 | 6.0 | 942 | 102 | 34 |
| 4 | 0.23 | 3.5 | 6.4 | 846 | 190 | 28 |
| 5 | 0.27 | 4.04 | 11.7 | 793 | 273 | 26 |
| 6 | 0.30 | 3.82 | 9.7 | 813 | 205 | 26 |
| 7 | 0.22 | 3.99 | 11.7 | 735 | 320 | 26 |
| 8 | 0.25 | 3.37 | 7.14 | 845 | 137 | 28 |
| 9 | 0.23 | 3.5 | 6.4 | 875 | 738 | 28 |
| 10 | 0.19 | 2.0 | 3.9 | 1182 | 686 | 33 |
| 11 | 0.20 | 4.44 | 11.0 | 686 | 730 | 25 |
| 12 | 0.16 | 2.07 | 4.4 | 1091 | 748 | 31 |
| 13 | 0.16 | 2.14 | 4.4 | 1089 | 751 | 30 |
| 14 | 0.19 | 3.00 | 6.0 | 900 | 730 | 28 |
| 15 | 0.22 | 3.02 | 6.0 | 908 | 732 | 28 |
| 16 | 0.20 | 4.53 | 11.0 | 685 | 726 | 25 |
| 17 | 0.20 | 4.54 | 11.0 | 695 | 715 | 25 |
| 18 | 0.20 | 4.36 | 11.8 | 683 | 717 | 24 |
| 19 | 0.20 | 4.43 | 12.8 | 686 | 738 | 25 |
| 20 | 0.26 | 3.53 | 7.14 | 899 | 544 | 29 |
| 21 | 0.19 | 4.35 | 10.5 | 694 | 721 | 25 |
| 22 | 0.19 | 4.41 | 10.5 | 691 | 740 | 25 |
| 23 | 0.20 | 4.47 | 10.5 | 707 | 755 | 25 |

The thermal properties of polymer Sample Nos. 1, 2, 3, 5, 9, 10, 12, 13, 14, and 15 were also tested. The following results were obtained:

TABLE 2

Thermal properties (DSC-HCH) testing results

| Sample No. | Tc, °C. | Tm - α form, °C. | Tm - β form, °C. | HCH 2$^{nd}$ heat β % |
|---|---|---|---|---|
| 1 | 107 | 146 | N/a | N/a |
| 2 | 106 | 147 | N/a | N/a |
| 3 | 101 | 142 | N/a | N/a |
| 5 | 105 | 140 | N/a | N/a |
| 9 | 109 | 141 | 129 | 41 |
| 10 | 116 | 148 | 136 | 39 |
| 12 | 112 | 152 | 136 | 72 |
| 13 | 112 | 152 | 136 | 73 |
| 14 | 108 | 146 | 132 | 72 |
| 15 | 108 | 147 | 132 | 73 |

As shown above, the addition of the property enhancing agent dramatically improved the impact resistance strength of the polymer composition without negatively impacting the flexural modulus.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims

What is claimed:

1. A polypropylene polymer composition comprising:
   (a) a polypropylene random copolymer comprising;
      propylene from about 99 wt % to about 95 wt % based on the total weight of the polypropylene random copolymer;
      an ethylene content (ET) of from about 1 wt % to about 5 wt % based on the total weight of the polypropylene random copolymer; and
      a melt flow rate of greater than about 0.01 g/10 min to about 2 g/10 min; and
   (b) a property enhancing agent, the property enhancing agent being present in the composition in an amount sufficient to increase an impact resistance or a flexural modulus of the composition and wherein the composition has an IZOD notched impact strength resistance at 23° C. of from about 400 J/m to about 900 J/m and has a flexural modulus of from about 650 MPa to about 1200 MPa; and
   wherein the propylene random copolymer is monomodal; and
   wherein the composition has a xylene soluble fraction (XS) of from about 2% to about 14% based on the total weight of the polypropylene polymer composition.

2. The polypropylene polymer composition of claim 1, wherein the property enhancing agent comprises a phosphate ester salt, sodium benzoate, a dibenzyl sorbitol, a metal salt of a carboxylic acid or mixtures thereof.

3. The polypropylene polymer composition of claim 1, wherein the property enhancing agent comprises sodium 2,2'-methylene-bis-(4,6-di-tert-butylphenyl) phosphate, a dibenzylidene sorbitol, 4-cyclohexone-1,2-dicarboxylic acid or mixtures thereof.

4. The polypropylene polymer composition of claim 2, wherein the polymer composition has a melt flow rate of from about 0.01 g/10 min to less than about 0.5 g/10 min, an ethylene content of from about 3.3% to about 4.5% by weight, and an IZOD notched impact strength resistance at 23° C. of greater than about 500 J/m to about 900 J/m.

5. The polypropylene polymer composition of claim 1, wherein the property enhancing agent comprises N,N'-dicyclohexylnaphthalene-2,6-dicarboxamide, a metal salt of 6-quinaziran sulfonic acid, a disodium salt of o-phthalic acid, an isophthalic acid, a terephthalic acid, or a combination of an organic dibasic acid and an oxide, a hydroxide, or an acid of a Group II metal.

6. The polypropylene polymer composition of claim 1, wherein the property enhancing agent comprises a combination of pimelic acid and calcium stearate.

7. The polypropylene polymer composition of claim 1, wherein the property enhancing agent comprises N,N'-dicyclohexylnaphthalene-2,6-dicarboxamide.

8. The polypropylene polymer composition of claim 5, wherein the polymer composition has a melt flow rate of from about 0.15 g/10 min to about 2 g/10 min, has an ethylene content of from about 1% to about 3.5% by weight, has a flexural modulus of greater than about 800 MPa to about 1200 MPa, and has an IZOD impact strength resistance at 23° C. of greater than about 600 J/m to about 900 J/m.

9. The polypropylene polymer composition of claim 1, wherein the property enhancing agent is present in the polymer composition in an amount from about 100 ppm to about 5000 ppm.

10. The polypropylene polymer composition of claim 1, wherein the polypropylene random copolymer is present in the polymer composition in an amount greater than about 70% by weight.

11. The polypropylene polymer composition of claim 1, wherein the polypropylene random copolymer has been Ziegler-Natta catalyzed.

12. The polypropylene polymer composition of claim 11, wherein the polypropylene random copolymer has been catalyzed in the presence of an internal electron donor comprising a non-phthalate, substituted phenylene aromatic diester.

13. The polypropylene polymer composition of claim 1, wherein the composition includes a second property enhancing agent, the second property enhancing agent comprising a metal stearate, a hydrotalcite, or talc.

14. A piping structure having a length and defining a first opening at one end and a second opening at an opposite end, the piping structure defining a hollow passageway therebetween, the piping structure being formed from the polypropylene polymer composition of claim 1.

15. The piping structure of claim 13, wherein the piping structure has been formed through extrusion.

16. A piping structure comprising;
   a tubular member having a length and defining a hollow interior passageway, the tubular member including a wall defining the interior passageway, the wall being made from a polypropylene polymer composition comprising;
   (a) a polypropylene random copolymer comprising;
      propylene from about 99 wt % to about 95 wt % based on the total weight of the polypropylene random copolymer;
      an ethylene content (ET) of from about 1 wt % to about 5 wt % based on the total weight of the polypropylene random copolymer; and a melt flow rate of greater than about 0.01 g/10 min to about 2 g/10 min; and (b) a property enhancing agent, the property enhancing agent being present in the composition in an amount sufficient to increase an impact resistance or a flexural modulus of the composition and wherein the composition has an IZOD notched impact strength resistance at 230 C of from about 400 J/m to about 900 J/m and has a flexural modulus of from about 650 MPa to about 1200 MPa;

wherein the propylene random copolymer is monomodal; and wherein the composition has a xylene soluble fraction (XS) of from about 2% to about 14% based on the total weight of the polypropylene polymer composition.

17. The piping structure of claim 16, wherein the property enhancing agent comprises a phosphate ester salt, sodium benzoate, a dibenzyl sorbitol, or mixtures thereof and wherein the polymer composition has a melt flow rate of from about 0.01 g/10 min to less than about 0.5 g/10 min, an ethylene content of from about 3.3% to about 5% by weight, and an IZOD notched impact strength resistance at 23° C. of greater than about 500 J/m to about 900 J/m.

18. The piping structure of claim 16, wherein the property enhancing agent comprises N,N'-dicyclohexylnaphthalene-2,6-dicarboxamide, a metal salt of 6-quinaziran sulfonic acid, a disodium salt of o-phthalic acid, an isophthalic acid, a terephthalic acid, or a combination of an organic dibasic acid and an oxide, a hydroxide, a metal salt of a 4-cyclohexene-1,2-dicarboxylic acid, or an acid of a Group II metal, and wherein the polymer composition has a melt flow rate of from about 0.15 g/10 min to about 2 g/10 min, has an ethylene content of from about 1% to about 3% by weight, has a flexural modulus of greater than about 800 MPa to about 1200 MPa, and has an IZOD impact strength resistance at 23° C. of greater than about 600 J/m to about 900 J/m.

19. A polypropylene polymer composition comprising:
(a) a polypropylene random copolymer comprising;
propylene from about 99 wt % to about 95 wt % based on the total weight of the polypropylene random copolymer;
an ethylene content (ET) of from about 1 wt % to about 5 wt % based on the total weight of the polypropylene random copolymer; and
a melt flow rate of greater than about 0.01 g/10 min to about 2 g/10 min; and
(b) a property enhancing agent comprising sodium 2,2'-methylene-bis-(4,6-di-tert-butylphenyl) phosphate, a dibenzylidene sorbitol, 4-cyclohexone-1,2-dicarboxylic acid or mixtures thereof, the property enhancing agent being present in the composition in an amount sufficient to increase an impact resistance or a flexural modulus of the composition and wherein the composition has an IZOD notched impact strength resistance at 23° C of from about 400 J/m to about 900 J/m and has a flexural modulus of from about 650 MPa to about 1200 MPa; and
wherein the propylene random copolymer is monomodal.

20. A polypropylene polymer composition comprising:
(a) a polypropylene random copolymer comprising;
propylene from about 99 wt % to about 95 wt % based on the total weight of the polypropylene random copolymer;
an ethylene content (ET) of from about 1 wt % to about 5 wt % based on the total weight of the polypropylene random copolymer; and
a melt flow rate of greater than about 0.01 g/10 min to about 2 g/10 min; and
(b) a property enhancing agent comprising a combination of pimelic acid and calcium stearate, the property enhancing agent being present in the composition in an amount sufficient to increase an impact resistance or a flexural modulus of the composition and wherein the composition has an IZOD notched impact strength resistance at 23° C. of from about 400 J/m to about 900 J/m and has a flexural modulus of from about 650 MPa to about 1200 MPa; and
wherein the propylene random copolymer is monomodal.

* * * * *